(12) United States Patent
Xiong et al.

(10) Patent No.: US 11,017,287 B2
(45) Date of Patent: *May 25, 2021

(54) FLEXIBLE MULTI-TASK NEUTRAL NETWORK FOR CONTENT RANKING

(71) Applicant: Facebook, Inc., Menlo Park, CA (US)

(72) Inventors: Liang Xiong, Fremont, CA (US); Yan Zhu, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 771 days.

This patent is subject to a terminal disclaimer.

(21) Appl. No.: 15/784,002

(22) Filed: Oct. 13, 2017

(65) Prior Publication Data

US 2019/0114528 A1  Apr. 18, 2019

(51) Int. Cl.
| | |
|---|---|
| *G06N 3/04* | (2006.01) |
| *G06F 7/08* | (2006.01) |
| *G06N 3/08* | (2006.01) |
| *G06N 5/02* | (2006.01) |
| *G06Q 30/02* | (2012.01) |
| *G06Q 50/00* | (2012.01) |
| *G06Q 10/10* | (2012.01) |

(52) U.S. Cl.
CPC ............. *G06N 3/04* (2013.01); *G06F 7/08* (2013.01); *G06N 3/0454* (2013.01); *G06N 3/08* (2013.01); *G06N 5/022* (2013.01); *G06Q 30/0242* (2013.01); *G06F 2207/4824* (2013.01); *G06Q 10/10* (2013.01); *G06Q 50/01* (2013.01)

(58) Field of Classification Search
CPC ..... G06F 2207/4824; G06F 7/08; G06N 3/04; G06N 3/0454; G06N 3/08; G06N 5/022; G06Q 10/10; G06Q 30/0242; G06Q 50/01

See application file for complete search history.

(56) References Cited

U.S. PATENT DOCUMENTS

| | | |
|---|---|---|
| 7,594,189 B1 | 9/2009 | Walker et al. |
| 2017/0124447 A1 | 5/2017 | Chang et al. |
| 2019/0114528 A1 | 4/2019 | Xiong et al. |

OTHER PUBLICATIONS

Ahmed et al, "Scalable Hierarchical Multitask Learning Algorithms for Conversion Optimization in Display Advertising", Feb. 28, 2014, WSDM'14, pp. 1-10 (Year: 2014).*

(Continued)

*Primary Examiner* — Kamran Afshar
*Assistant Examiner* — Brent Johnston Hoover
(74) *Attorney, Agent, or Firm* — Fenwick & West LLP

(57) ABSTRACT

For a content item with unknown tasks performed by a viewing user on an online system, the online system predicts a likelihood of interacting with each content item using a prediction model associated with a plurality of tasks. The prediction model comprises a plurality of independent layers, a plurality of shared layers and a plurality of separate layers. Each independent layer is configured to extract features, for each task, that are not shared across the plurality of tasks. The plurality of shared layers are configured to extract common features that are shared across the plurality of tasks. Each separate layer is configured to predict likelihood of the viewing user performing a task associated with the separate layer based on the features extracted from the plurality of independent layers and the plurality of shared layers.

20 Claims, 8 Drawing Sheets

(56) References Cited

OTHER PUBLICATIONS

Riemer et al., "A Deep Learning and Knowledge Transfer Based Architecture for Social Media User Characteristic Determination", Jun. 5, 2015, Proceedings of SocialNLP 2015@NAACL-HLT, pp. 39-47 (Year: 2015).*
Qi et al., "A Unified Multitask Architecture for Predicting Local Protein Properties", Mar. 2012, PLoS One, vol. 7, Issue 3, pp. 1-11 (Year: 2012).*
Zhu et al., "Predicting User Activity Level in Social Networks", Nov. 1, 2013, CIKM'13, pp. 1-10 (Year: 2013).*
Peng et al., "Multi-task Domain Adaptation for Sequence Tagging", May 30, 2017, in RepL4NLP, 2017, pp. 91-100. (Year: 2017).*
Ahmed, A. et al. "Scalable Hierarchical Multitask Learning Algorithms for Conversion Optimization in Display Advertising." WSDM '14: Proceedings of the 7th ACM International Conference on Web Search and Data Mining, Feb. 28, 2014, pp. 1-10.
Huang, W. et al. "Deep Architecture for Traffic Flow Prediction: Deep Belief Networks with Multitask Learning." IEEE Transactions on Intelligent Transportation Systems, vol. 15, Iss. 5, Oct. 2014, pp. 2191-2201.
Riemer, M. et al. "A Deep Learning and Knowledge Transfer Based Architecture for Social Media User Characteristic Determination." Proceedings of SocialNLP@NAACL-HLT, Jun. 5, 2015, pp. 39-47.
United States Office Action, U.S. Appl. No. 15/469,550, dated Jan. 15, 2020, 29 pages.
Zhu, Y. et al. "Predicting User Activity Level in Social Networks." CIKM '13: Proceedings of the 22nd ACM International Conference on Information & Knowledge Management, Oct. 2013, pp. 1-10.
United States Office Action, U.S. Appl. No. 15/469,550, dated May 13, 2020, 33 pages.
Wang, L. et al. "Multi-Task Learning for Gender and Age Prediction on Chinese Microblog." Natural Language Understanding and Intelligent Applications, NLPCC-ICCPOL, vol. 10102, Dec. 2-6, 2016, pp. 189-200.

* cited by examiner

FLEXIBLE MULTI-TASK NEUTRAL NETWORK FOR CONTENT RANKING

BACKGROUND

This disclosure relates generally to content ranking, and more specifically to ranking content based on prediction of interactions between viewing users and the content using flexible multi-task neutral networks.

A feed (e.g., Newsfeed) is a constantly updating list of content items (e.g., posts) for presentation to a viewing user in an online system. The content items in the feed may be ranked in an order of how likely a viewing user is to find each story worthwhile. One useful approach for ranking content items in a feed is based on a neural network model that predicts how likely a viewing user will interact with each content item in the feed. A neural network model has multiple layers that are connected with each other. Each layer has multiple interconnected neurons (also referred to as nodes). A prediction process based on the neural network model requires large amounts of computations to compute weight for each neuron and for each connection. This prediction process results in high usage of a processing unit (e.g., central processing unit, or a graphics processing unit). The high usage of a processing unit prevents the neural network from developing a large neural network structure, predicating large amounts of events for each content item, and training a neural network model using a large volume of training data.

SUMMARY

For various tasks (or actions), an online system predicts the likelihood that a user will perform the tasks with a content item. Examples of tasks may include liking a content item, sharing a content item, commenting on a content item, sharing a content item with message, installing an application associated with a content item, following on a content item, clicking on a content item, visiting a website via clicking on a content item, placing a content item in a virtual shopping cart, or purchasing a content item. The online system derives a feature vector for each content item. Examples of a feature vector may include characteristics of a corresponding content item, characteristics of a poster who posted the corresponding content item, characteristics of the viewing user, and relationships among the corresponding, the poster and the viewing user. The online system predicts a likelihood of interacting with each content item using a prediction model associated with a plurality of tasks. The prediction model comprises a plurality of independent layers, a plurality of shared layers and a plurality of separate layers. Each independent layer is configured to extract features, for each task, that are not shared across the plurality of tasks. The plurality of shared layers are configured to extract common features that are shared across the plurality of tasks. Each separate layer is configured to predict likelihood of the viewing user performing a task associated with the separate layer based on the features extracted from the plurality of independent layers and the plurality of shared layers. The online system ranks the plurality of content items based on the predicting. The ranking is used to place the content items in a feed in which the user may perform the tasks on the content item.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Example of Newsfeed in Online System

Figure 1:
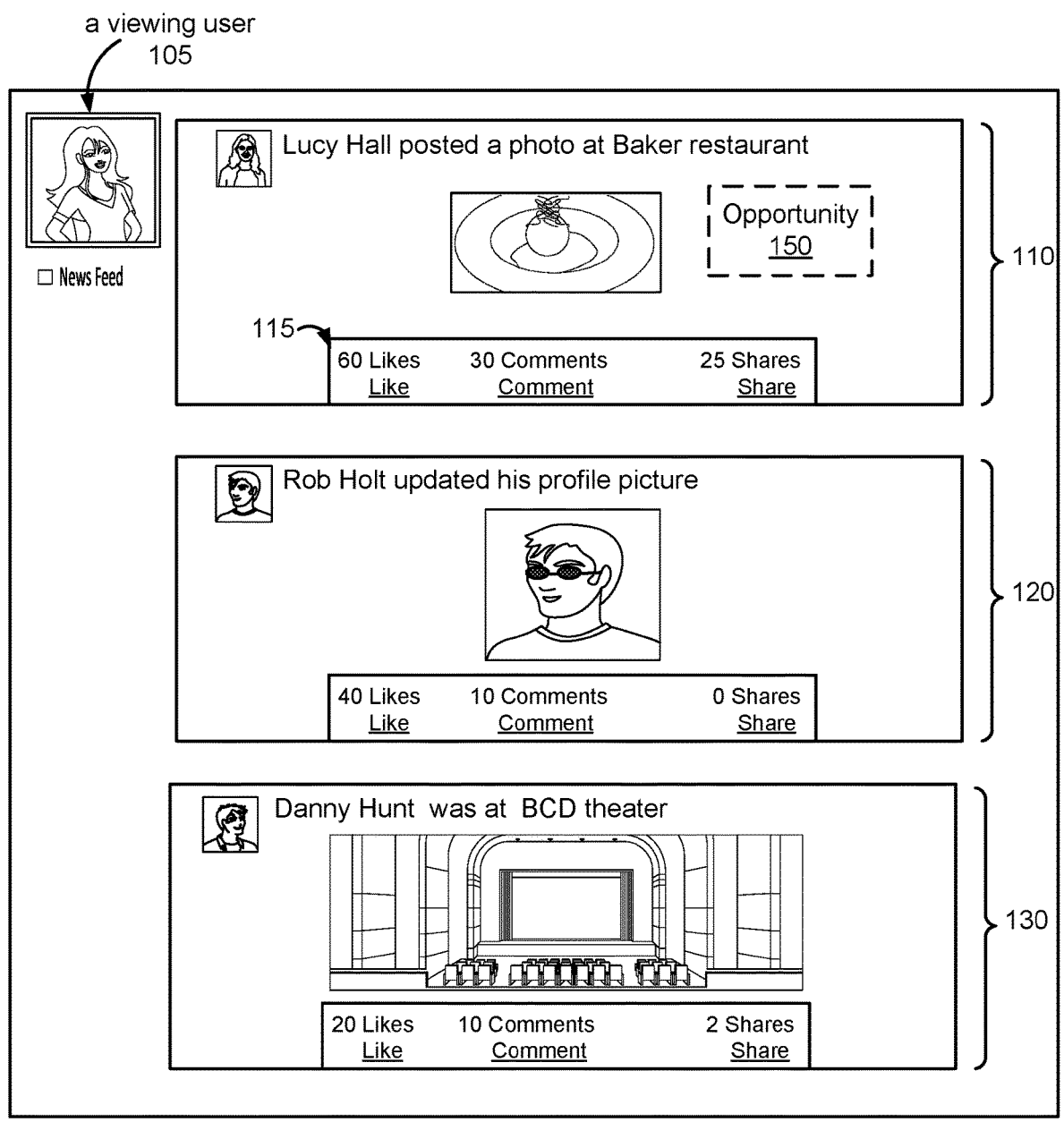
FIG. 1 is an example of a newsfeed presented to a viewing user, in accordance with an embodiment.

FIG. 1 is an example of a newsfeed 100 presented to a viewing user 105, in accordance with an embodiment. In the embodiment of FIG. 1, a viewing user 105 may be a user of an online system. A newsfeed 100 presented to the viewing user 105 includes three content items 110-130. Examples of content items may include a post, a story, a photo (e.g., 110), a status update (e.g., 120), an activity (e.g., 130), a video, a link, a like from people, a page, an advertisement, or a group that a viewing user follows on an online system. In various embodiments, a newsfeed 100 may include any number of content items (e.g., hundreds). Each content item shown in FIG. 1 indicates three actions that the viewing user 105 may perform. For example, a region 115 in the content item 110 includes three options that are "like," "comment," and "share." The viewing user 105 may or may not select any of the three options. If the viewing user 105 selects "like" in the content item 110, the number of "likes" will increase by one. The total number of "likes" will become 61. The three content items 110-130 may be ranked based on a flexible multi-task neural network prediction model that predicts how likely the viewing user 105 will interact with each content item. For example, the content item 110 ranks first indicating the viewing user 105 is most likely to perform any action (e.g., like, comment, or share) on the content item 110.

When an opportunity 150 arises to present a content item (e.g., an advertisement, not shown) to the viewing user 105, a group of content items is identified based on the flexible multi-task neural network prediction model that predicts how likely the viewing user 105 will interact with each content item. The group of content items is ranked based on their predictions, and a content item ranks first indicating the viewing user 105 is most likely to perform actions on the content item (e.g., clicking on the content item, visiting a website via clicking on the content item, placing the content item in a virtual shopping cart, or purchasing the content item). The content item ranking first is delivered to the viewing user 105 for the opportunity. The flexible multi-task neural network model is further described below.

Overview of System Environment

Figure 2:
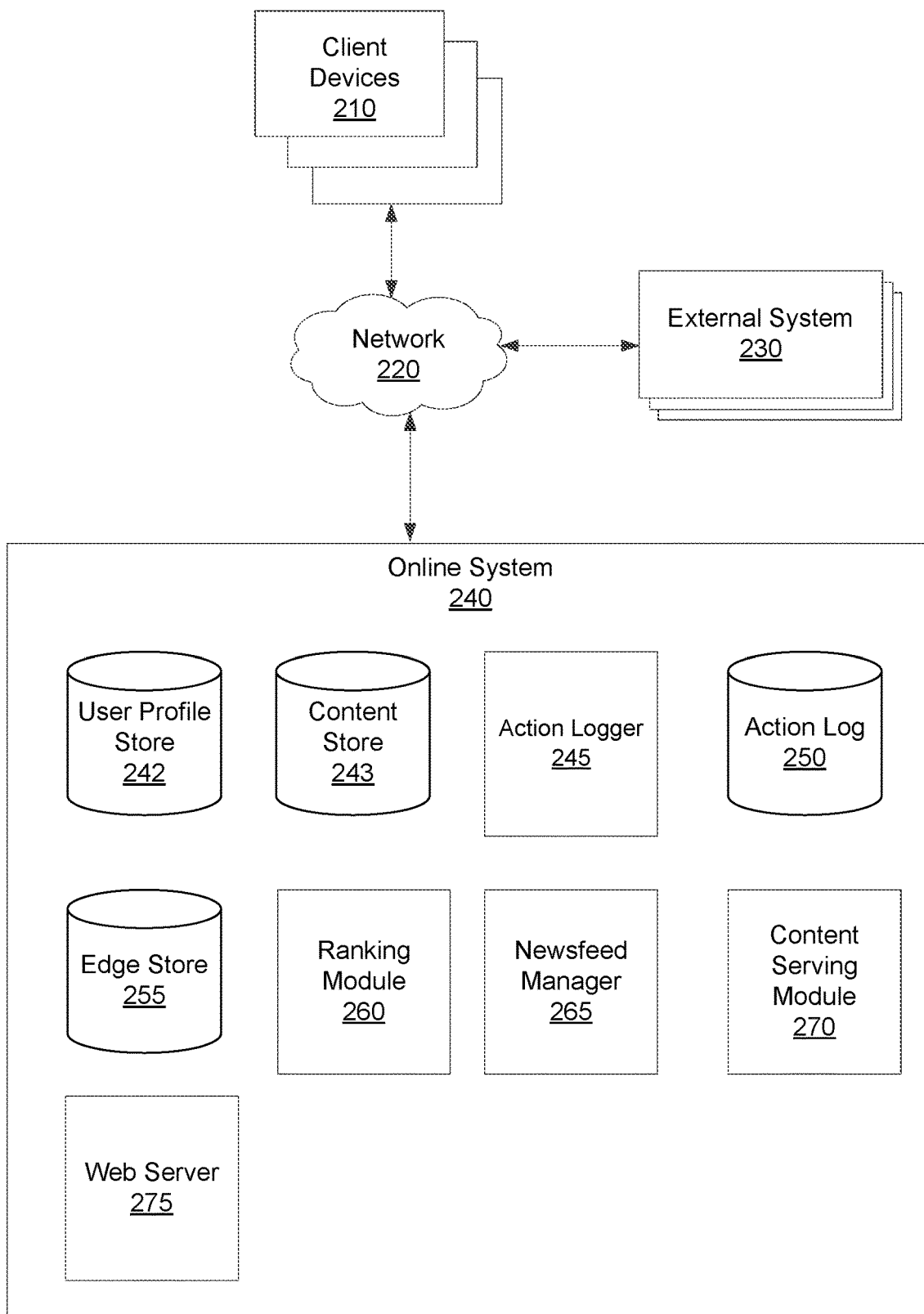
FIG. 2 is a system environment of an online system including a ranking module, in accordance with an embodiment.

FIG. 2 is a system environment 200 of an online system 240 including a ranking module 260, in accordance with an embodiment. The system environment 200 shown by FIG. 2 comprises one or more client devices 210, a network 220, one or more external systems 230, and the online system 240. In alternative configurations, different and/or additional components may be included in the system environment 200. The embodiments described herein can be adapted to online systems that are not social networking systems.

The client devices 210 are one or more computing devices capable of receiving user input as well as transmitting and/or receiving data via the network 220. In one embodiment, a client device 210 is a conventional computer system, such as a desktop or laptop computer. Alternatively, a client device 210 may be a device having computer functionality, such as a personal digital assistant (PDA), a mobile telephone, a smartphone or another suitable device. A client device 210 is configured to communicate via the network 220. In one embodiment, a client device 210 executes an application allowing a user of the client device 210 to interact with the online system 240. For example, a client device 210 executes a browser application to enable interaction between the client device 210 and the online system 240 via the network 220. In another embodiment, a client device 210 interacts with the online system 240 through an application programming interface (API) running on a native operating system of the client device 210, such as IOS® or ANDROID™.

The client devices 210 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more external systems 230 may be coupled to the network 220 for communicating with the online system 240. In one embodiment, an external system 230 is an application provider communicating information describing applications for execution by a client device 210 or communicating data to client devices 210 for use by an application executing on the client device. In other embodiments, an external system 230 provides content or other information for presentation via a client device 210. An external system 230 may also communicate information to the online system 240, such as advertisements, content, or information about an application provided by the external system 230. When providing a content item to the online system 240 for distribution to users, the external systems 230 may provide information that describes the context in which the online system 240 should provide the content item to users, such as properties of the users to whom the content item should be provided (e.g., age, gender, or particular interests), or properties of webpages in which the content item should be included (e.g., the topic(s) of the pages).

The online system 240 allows its users to post social networking content (e.g., stories, photos, videos, and invitations) to the online system 240 for presentation to other users of the online system 240, allowing the users interact with each other. Additionally, the online system 240 typically generates content items describing actions performed by users and identified by the online system 240. For example, a content item is generated when a user of an online system 240 checks into a location, shares content posted by another user, or performs any other suitable interaction. The online system 240 presents content items describing an action performed by a user to an additional user (e.g., the viewing user 105) connected to the user via a flexible multi-task neural network model that predicts how likely the additional user will interact with the presented content items.

When the additional user performs some actions on the presented content items, the online system 240 tracks features to generate first training data that can be used to train the flexible multi-task network prediction model for predicting various interactions between the online system's users and social networking content.

In various embodiments, the online system 240 is adapted to provide other types of content that is not social networking content. The external systems 230 may request that online system 240 run campaigns to have content items (e.g., advertisements) distributed to users of the online system 240. The online system 240 receives from the external systems 230 a content item along with information indicating a content delivery strategy that is to be used for the distribution of the content item to users. A content delivery strategy may be, for example, that the content item be provided to a wide range of users to promote a brand/product/service. As another example, the content delivery strategy may be that the content item be presented to users that are likely to perform a certain event upon being presented with the content item, such as selecting (e.g., clicking on) the content item, visiting a website, placing an item in a virtual shopping cart, or making a purchase.

When a content item is delivered by the online system 240 to the client device 210 according to a content delivery strategy, the online system 240 tracks features as if the content item was delivered according one or more different content delivery strategies. The tracking of the features allows the online system 240 to generate second training data that can be used to train the flexible multi-task network prediction model for different content delivery strategies.

Additionally, the second training data can be used to further train the flexible multi-task network prediction model for predicting various interactions between the online system's users and social networking content. The first training data can be used to further train the flexible multi-task network prediction model for different content delivery strategies. Examples are further described in FIGS. 4A-4C.

Example of Online System

The online system 240 shown in FIG. 1 includes a user profile store 242, a content store 243, an action logger 245, an action log 250, an edge store 255, a ranking module 260, a newsfeed manager 265, a content serving module 270, and a web server 275. In other embodiments, the online system 240 may include additional, fewer, or different components for various applications. Conventional components such as network interfaces, security functions, load balancers, failover servers, management and network operations consoles, and the like are not shown so as to not obscure the details of the system architecture.

Each user of the online system 240 is associated with a user profile, which is stored in the user profile store 242. A user profile includes declarative information about the user that was explicitly shared by the user and may also include profile information inferred by the online system 240. In one embodiment, a user profile includes multiple data fields, each describing one or more attributes of the corresponding user of the online system 240. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 240 displayed in an image. A user profile in the user profile store 242 may also maintain references to actions by the corresponding user performed on content items in the content store 243 and stored in the action log 250.

While user profiles in the user profile store 242 are frequently associated with individuals, allowing individuals to interact with each other via the online system 240, user profiles may also be stored for entities such as businesses or organizations. This allows an entity to establish a presence on the online system 240 for connecting and exchanging content with other online system users. The entity may post information about itself, about its products or provide other information to users of the online system 240 using a brand page associated with the entity's user profile. Other users of the online system 240 may connect to the brand page to receive information posted to the brand page or to receive information from the brand page. A user profile associated with the brand page may include information about the entity itself, providing users with background or informational data about the entity.

The content store 243 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 243, such as status updates, photos tagged by users to be associated with other objects in the online system 240, events, groups or applications. In some embodiments, objects are received from third-party applications or third-party applications separate from the online system 240. In one embodiment, objects in the content store 243 represent single pieces of content, or content "items." Hence, users of the online system 240 are encouraged to communicate with each other by posting text and content items of various types of media through various communication channels. This increases the amount of interaction of users with each other and increases the frequency with which users interact within the online system 240.

In some embodiments, a content item may be received by the online system 240 from the external system 230 for distribution to users. The external system 230 may also provide content constraints and indicate a content delivery strategy that is to be used to deliver the content item to users. Content constraints may include a budget for the content item, one or more time periods during which the content item can be displayed to users, and any other constraints affecting presentation of the content item. The content delivery strategy indicates a goal or a purpose for delivering the content item to users. For example, a content delivery strategy may be to present the content item to users that are likely to perform a certain event. As another example, the purpose of the content item may not be to get users to perform a certain event but rather to remind users about a brand, product, or service. Along with the content item, the content store 243 also stores the constraints and content delivery strategy associated with the content item.

The action logger 245 receives communications about user actions internal to and/or external to the online system 240, populating the action log 250 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 250.

The action log 250 may be used by the online system 240 to track user actions on the online system 240, as well as actions on external systems 230 that communicate information to the online system 240. Users may interact with various objects on the online system 240, and information describing these interactions are stored in the action log 250. Examples of interactions with objects include: commenting on posts, sharing links, and checking-in to physical locations via a mobile device, accessing content items, and any other interactions. Additional examples of interactions with objects on the online system 240 that are included in the action log 250 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 250 may record a user's interactions with advertisements on the online system 240 as well as with other applications operating on the online system 240. In some embodiments, data from the action log 250 is used to infer interests or preferences of a user, augmenting the interests included in the user's user profile and allowing a more complete understanding of user preferences.

The action log 250 may also store user actions taken on an external system 230, such as an external website, and communicated to the online system 240. For example, an e-commerce website that primarily sells sporting equipment at bargain prices may recognize a user of the online system 240 through a social plug-in enabling the e-commerce website to identify the user of the online system 240. Because users of the online system 240 are uniquely identifiable, e-commerce websites, such as this sporting equipment retailer, may communicate information about a user's actions outside of the online system 240 to the online system 240 for association with the user. Hence, the action log 250 may record information about actions users perform on the external system 230, including webpage viewing histories, advertisements that were engaged, purchases made, and other patterns from shopping and buying.

In one embodiment, the edge store 255 stores information describing connections between users and other objects on the online system 240 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 240, such as expressing interest in a page on the online system 240, sharing a link with other users of the online system 240, and commenting on posts made by other users of the online system 240. Users and objects within the online system 240 can represented as nodes in a social graph that are connected by edges stored in the edge store 255.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 240, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 255 also stores information about edges, such as affinity scores for objects, interests, and other users. Affinity scores, or "affinities," may be computed by the online system 240 over time to approximate a user's affinity for an object, interest, and other users in the online system 240 based on the actions performed by the user. A user's affinity may be computed by the online system 240 over time to approximate a user's affinity for an object, interest, and other users in the online system 240 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 255, in one embodiment. Alternatively, each interaction between a user and a specific object is stored as a separate edge. In some embodiments, connections between users may be stored in the user profile store 242, or the user profile store 242 may access the edge store 255 to determine connections between users.

The ranking module 260 ranks content items presented to a viewing user (or will be presented to a viewing user) of the online system 240 based on the flexible multi-task neutral network prediction model that predicts how likely the viewing user will interact with each content item. The flexible multi-task neutral network prediction model predicts interactions between the viewing user and content items presented by one or more posters (or received from the external systems 230) based on at least three types of layers. The three types of layers include shared layers, independent layers, and separate layers. The shared layers extract common features that are shared across tasks by sharing layers among the prediction of the various tasks. Each independent layer extracts features for a specific task, and the extracted features are not shared across various tasks. The separate layers predict a likelihood of the viewing user performing a specific task associated with the content items. A task describes an interaction between the viewing user with the content items. Examples of a task associated with a content item may include liking the content item, sharing the content item, commenting on the content item, sharing the content item with message, installing an application associated with the content item, following on the content item, clicking on the content item, visiting a website via clicking on the content item, placing the content item in a virtual shopping cart, or purchasing the content item. An example of the ranking module 260 is further described in FIG. 3, and examples of the flexible multi-task neutral network prediction model are further described in FIGS. 4A-4C.

The newsfeed manager 265 may generate content for presentation to a user based on information in the action log 250 and in the edge store 255 or may select candidate stories included in content store 243. One or more of the candidate stories are selected and presented to a user by the newsfeed manager 265.

For example, the newsfeed manager 265 receives a request to present one or more stories to an online system user. The newsfeed manager 265 accesses one or more of the user profile store 242, the content store 243, the action log 250, and the edge store 255 to retrieve information about the identified user. For example, stories or other data associated with users connected to the identified user are retrieved. The retrieved stories or other data is analyzed by the newsfeed manager 265 to identify content likely to be relevant to the identified user. For example, stories associated with users not connected to the identified user or stories associated with users for which the identified user has less than a threshold affinity are discarded as candidate stories. Based on various criteria, the newsfeed manager 265 selects one or more of the candidate stories for presentation to the identified user.

In various embodiments, the newsfeed manager 265 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profile store 242. The newsfeed manager 265 may also determine the order in which selected stories are presented via the newsfeed. For example, the newsfeed manager 265 determines that a user has a highest affinity for a specific user and increases the number of stories in the newsfeed associated with the specific user or modifies the positions in the newsfeed where stories associated with the specific user are presented.

The newsfeed manager 265 may also account for actions by a user indicating a preference for types of stories and selects stories having the same, or similar, types for inclusion in the newsfeed. Additionally, newsfeed manager 265 may analyze stories received by an online system 240 from various users and obtains information about user preferences or actions from the analyzed stories. This information may be used to refine subsequent selection of stories for newsfeeds presented to various users.

The content serving module 270 receives content items from the various external systems 230 for provision to users to whom the content would be relevant and delivers appropriate content items to users, and stores the received content items in the content store 243. The content serving module 270 sends the received content items to the ranking module 260 for ranking the content items based on the flexible multi-task neural network prediction model. The content serving module 270 selects one or more content items to be delivered to the client device 210 for presentation to the user based on the ranking. For example, when an opportunity arises to present a content item to the user, the content serving module 270 selects a content item that a user is most likely to perform actions on (e.g., clicking on the content item, visiting a website via clicking on the content item, placing the content item in a virtual shopping cart, or purchasing the content item). The content serving module 270 delivers the selected content item to the user for the opportunity.

The web server 275 links the online system 240 via the network 220 to the one or more client devices 210, as well as to the one or more external systems 230. The web server 275 serves web pages, as well as other web-related content, such as JAVA®, FLASH®, XML and so forth. The web server 275 may receive and route messages between the online system 240 and the client device 210, for example, instant messages, queued messages (e.g., email), text messages, short message service (SMS) messages, or messages sent using any other suitable messaging technique. A user may send a request to the web server 275 to upload information (e.g., images or videos) that are stored in the content store 243. Additionally, the web server 275 may provide application programming interface (API) functionality to send data directly to native client device operating systems, such as IOS®, ANDROID™, WEBOS® or RIM®.

Content Ranking Based on Flexible Multi-Task Neural Network Prediction Model

Figure 3:
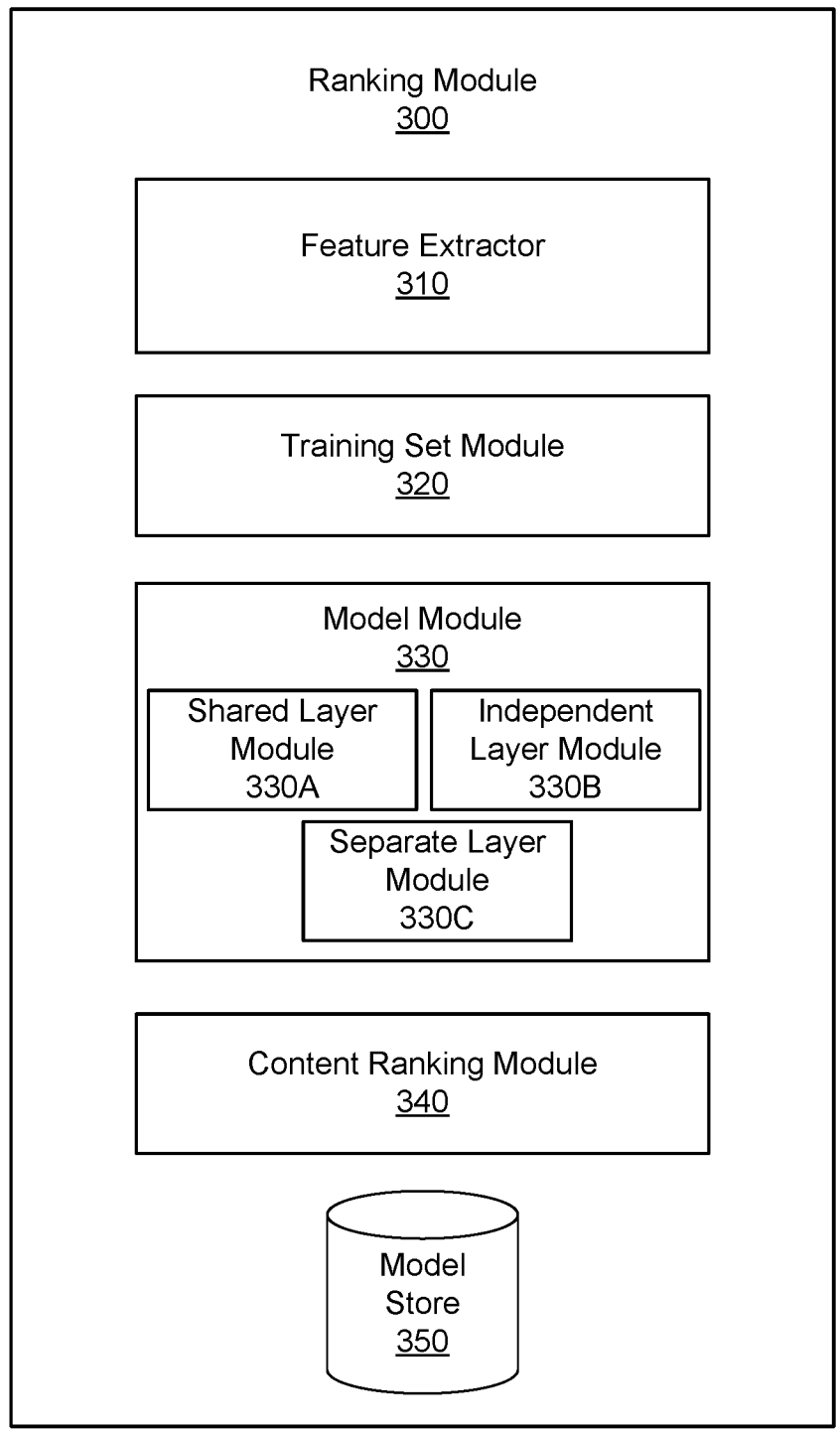
FIG. 3 is a block diagram of a ranking module of an online system, in accordance with an embodiment.

FIG. 3 is a block diagram of a ranking module 300 of the online system 240, in accordance with an embodiment. The ranking module 300 shown in FIG. 3 includes a feature extractor 310, a training set module 320, a model module 330 having a shared layer module 330A, an independent layer module 330B, and a separate layer module 330C, a content ranking module 340, and a model store 350. In other embodiments, the ranking module 300 is one of embodiments of the ranking module 260. In some embodiments, the ranking module 300 may include additional, fewer, or different components for various applications. For example, the ranking module 300 may include an interface. The interface may facilitate communications among components of the ranking module 300, and/or components of the online system 240.

The feature extractor 310 generates feature vectors for each content item. A feature vector associated with a content item describes characteristics of the content item, characteristics of a poster who posts the content item, characteristics of a viewing user whom the content item is presented to, relationships among the characteristics of the content item, the poster, and the viewing user. Examples of characteristics of the content item may include textual content, topics associated with the content item (e.g., derived from the textual content), posted time, a posted location, an activity (e.g., attending an event, making a purchase, and following on one or more additional users), content delivery strategies associated with the content item, interactions between the content item and additional user (e.g., an additional user likes, clicks on or purchases the content item). Examples of characteristics of the poster may include the poster's user profile, and the poster's location. Examples of characteristics of the viewing user may include the viewing user's user profile, and the viewing user's current location. Examples of relationships may include prior interactions between the content item (e.g., characteristics of the content item) and the viewing user, affinities between the poster and/or poster's friends and the viewing user, a time period when the content item is to be presented to the viewing user, and a recurring frequency of the content item that was presented to the viewing user.

The training set module 320 generates a positive set and a negative set for training a model using feature vectors extracted by the feature extractor 310 for each content item. The positive set includes feature vectors of content items for which the content item did in fact have one or more specific interactions (e.g., liking the content item, commenting on the content item, sharing the content item, clicking on the content item, or purchasing the content item, etc.) with the viewing user. The negative set includes feature vectors of content items for which the content item did not have one or more specific interactions with the viewing user. For example, assume that multiple content items are presented to a viewing user and the viewing user comments on (or clicking on) one of the multiple content items. The feature extractor 310 derives feature vectors of the multiple content items. The training set module 320 generates a positive set using the feature vectors of the content item that the viewing user comments on (or clicking on), and a negative set using feature vectors of other remaining content items. Thus, the negative set may include those content items that were presented to a user, but for which the user did not perform an interaction.

The model module 330 trains a flexible multi-task neutral network prediction model using the training set from the training set module 320. The training process is referred to a multi-task learning. The prediction model describes a relationship between the viewing user and the content item, and outputs an indication of whether the viewing user will perform one or more specific interactions with the content item. The prediction model includes a shared layer module 330A, an independent layer module 330B, and a separate layer module 330C. The shared layer module 330A may include multiple low layers that extract common feature representations across all the tasks. Examples of functions that are performed by the shared layer module 330A may include linear and non-linear transforms, aggregation, regularizations (e.g., $L_1$-norm regularization, $L_2$-norm regularization, low-rank-based regularization, mean-based regularization, dropout, etc.), or shared parameter process (e.g., Gaussian process). The independent layer module 330B extracts features for each specific task, and the extracted features are not shared across various tasks. The independent layer module 330B may have three types of layers including bottom layers, low layers and middle layers. The bottom layers of the independent layer module 330B can be an input of the shared layer module 330A. The low layers of the independent layer module 330B are at the same level of the shared layer module 330A. The middle layers of the independent layer module 330B combines features extracted from the shared layer module 330A and features extracted from the low layers of the independent layer module 330B to generate combined features as inputs for the separate layer module 330C. The separate layer module 330B may include multiple top layers that use task-specific neurons to realize separate predictions. In some embodiments, each top layer is associated with a specific task. The separate layer module 330B may generate a score indicating a likelihood that how likely the viewing user may a specific task associated with the content item.

In some embodiments, during the multi-task learning, for a specific task, the model module 330 trains shared layers, independent layers associated with the specific task, and a separate layer associated with the specific task included in the prediction model, using the training set by weighting the various features in each feature vectors, such that features that are more relevant to one or more specific tasks performed by the viewing user tend to have higher weight than features that are less relevant to the one or more specific tasks. For example, assume that a first feature indicates a poster associated with a posted content item is one of best friends of the viewing user, and that a second feature indicates a location where the poster posted the content item, and that the first feature is more predictive than the second feature. In this case, the prediction model may assign a higher weight to the first feature than the second feature, indicating that the first feature is more predictive of the specific tasks than the second feature based on the comparative frequency that these factors affect the likelihood of this interaction. For a next specific task, the model module 330 selects a corresponding training set to train shared layers, independent layers associated with the next specific task, and a separate layer associated with the next specific task. The prediction model is updated accordingly. The trained prediction model is stored in the model store 350.

In various embodiments, for a specific task, the model module 330 only trains independent layers associated with the specific task and a separate layer associated with the specific task. For a next specific task, the model module 330 only trains independent layers associated with the next specific task and a separate layer associated with the next specific task.

In some embodiments, the model module 330 trains a prediction model based on one or more algorithms. Examples of algorithms may include gradient boosted decision trees (GBDT), SVM (support vector machine), neural networks, logistic regression, naïve Bayes, memory-based learning, random forests, decision trees, bagged trees, etc.

The content ranking module 340 ranks the content items to be presented based in part on the prediction model generated by the model module 330. The prediction model generates, for each content item, a likelihood score indicating how likely the viewing user will perform one or more specific tasks associated with a corresponding content item. For example, for each content item, the feature extractor 310 derives feature vectors for each content item. The content ranking module 340 also retrieves the prediction model previously generated by the model module 330. The content ranking module 340 applies the feature vector to the prediction model and scores the content items to predict how likely that the viewing user will perform one or more specific tasks. The content ranking module 340 ranks the content items based on the scores. For example, the content ranking module 340 ranks the content item with highest score on the top. The highest score of the content item indicates the viewing user is mostly likely to perform one or more specific tasks with the content item.

Figure 4A:
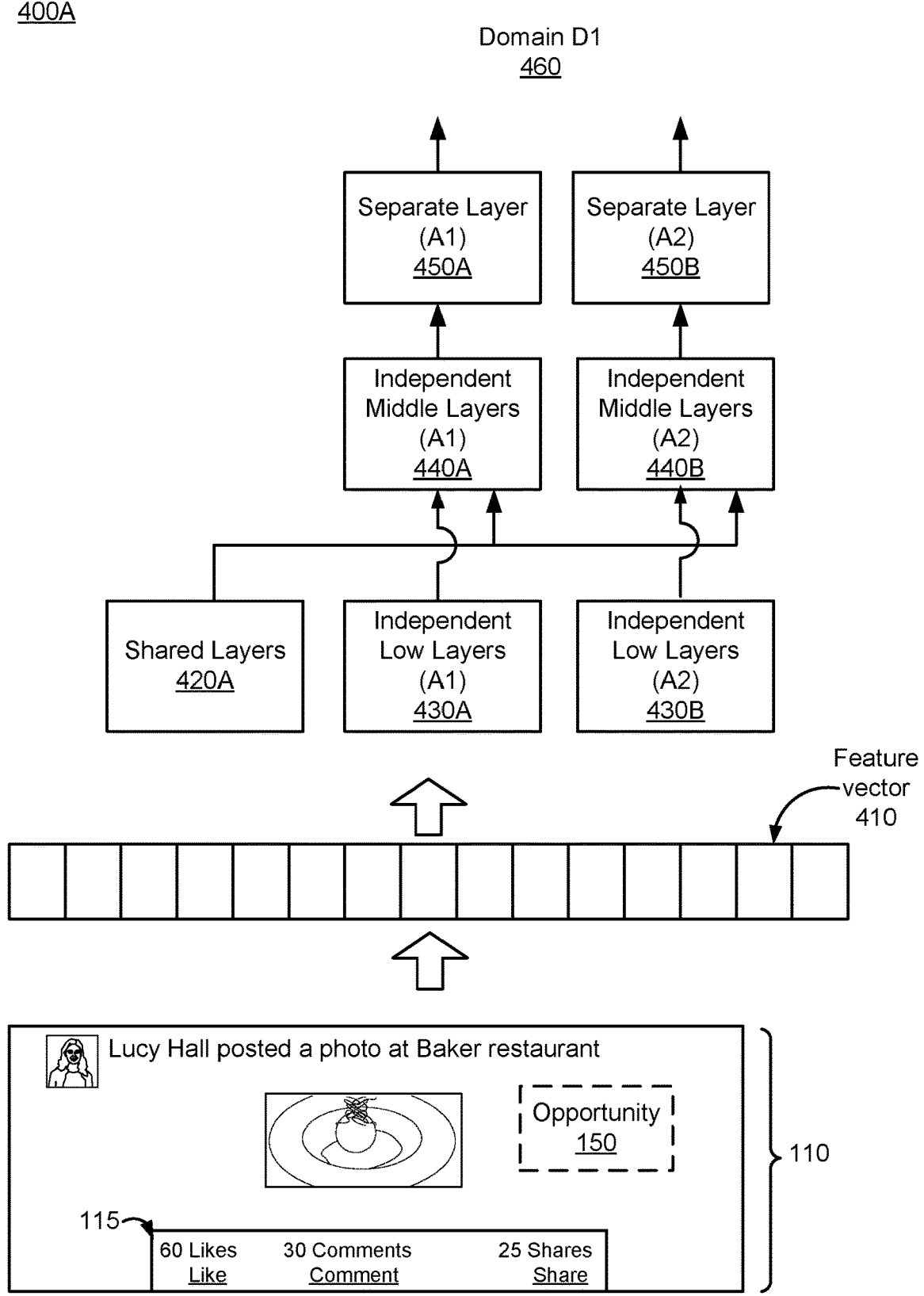
FIG. 4A is an example of a first flexible multi-task neural network prediction model applied to a content item for predicting interactions between a viewing user and the content item, in accordance with an embodiment.

FIG. 4A is an example of a first flexible multi-task neural network prediction model 400A applied to the content item 110 for predicting one or more specific tasks between the viewing user 105 and the content item 110, in accordance with an embodiment. The content item 110 will be presented to the viewing user 105. As shown in FIG. 4A, the prediction model 400A includes one or more shared layers 420A, one or more independent low layers 430A associated with a task A1, one or more independent low layers 430B associated with a task A2, one or more independent middle layers 440A associated with the task A1, one or more independent middle layers 440B associated with the task A2, a separate layer 450A associated with the task A1, and a separate layer 450B associated with the task A2. Tasks A1 and A2 are tasks in a task domain D1 460 that is a category of tasks performed by a user. As shown in FIG. 4A, the task domain D1 460 is for feed ranking. Examples of tasks in the task domain D1 460 include liking a content item, or sharing a content item. Alternatively (not shown in FIG. 4A), the prediction model 400A includes one or more additional separate layers associated with other suitable tasks.

A feature vector 410 associated with the content item 110 is generated. The feature vector 410 includes features associated with characteristics of the poster Lucy Hall (e.g., information included in Lucy Hall's user profile, Lucy Hall's current location), features associated with characteristics of the content item 110, features associated with characteristics of the viewing user (e.g., information included in the viewing user's user profile and the viewing user's location), and features associated with relationships among the poster, the viewing user and the content item 110. Examples of characteristics of the content item 110 may include a type of the content item 110 (e.g., a photo), the impression opportunity 150, a group of content items associated with the impression opportunity 150, previous interactions between the viewing user 105 and the group of content items, previous interactions between the poster and the group of content items, previous interactions between additional users and the group of content items, a location (e.g., Baker restaurant) that the poster posted the content item 110, interactions between the content item 110 and additional users (e.g., the number of "likes," the number of "comments", and the number of "shares"). Examples of relationships may include prior interactions between the content item 110 (e.g., characteristics of the content item 110) and the viewing user, affinities between the poster and/or poster's friends and the viewing user, a time period when the content item 110 is to be presented to the viewing user, and a recurring frequency of the content item 110 that was presented to the viewing user.

The feature vector 410 is an input to the shared layers 420A, an input to the independent low layers 430A, and an input to the independent low layer 430B. The shared layers 420A generate common features (e.g., features associated with characteristics of the viewing user) across the tasks A1 and A2. The independent low layers 430A generate features (e.g., features associated with previous interactions that the viewing user 105 clicked on "likes") that are specific to the task A1, and the generated features are not shared across the tasks A1 and A2. The independent low layers 430A generate features (e.g., features associated with previous interactions that the viewing user 105 clicked on "shares") that are specific to the task A1, and the generated features are not shared across the tasks A1 and A2.

The independent middle layers 440A combine the common features outputted from the shared layers 420A and features outputted from the independent low layers 430A to generate a first plurality of combined features. The independent middle layers 440B combine the common features outputted from the shared layers 420A and features outputted from the independent low layers 430B to generate a second plurality of combined features. The first plurality of combined features are inputs to the separate layer 450A for predicting how likely the viewing user 105 will perform the task A1. The second plurality of combined features are inputs to the separate layer 450B for predicting how likely the viewing user 105 will perform the task A2.

In various embodiments (not shown), the prediction model 400A doesn't include the independent middle layers 440A and 440B. The features outputted from the shared layers 420A and features outputted from the independent low layers 430A are inputs to the separate layer 450A for predicting how likely the viewing user 105 will perform the task A1. The features outputted from the shared layers 420A and features outputted from the independent low layers 430B are inputs to the separate layer 450B for predicting how likely the viewing user 105 will perform the task A2. As such, compared with conventional multi-task neural network prediction model, the flexible multi-task neural network prediction model 400A allows each task to have more independence, and reduces restriction and interference among the task while training, thereby resulting in better prediction results.

Figure 4B:
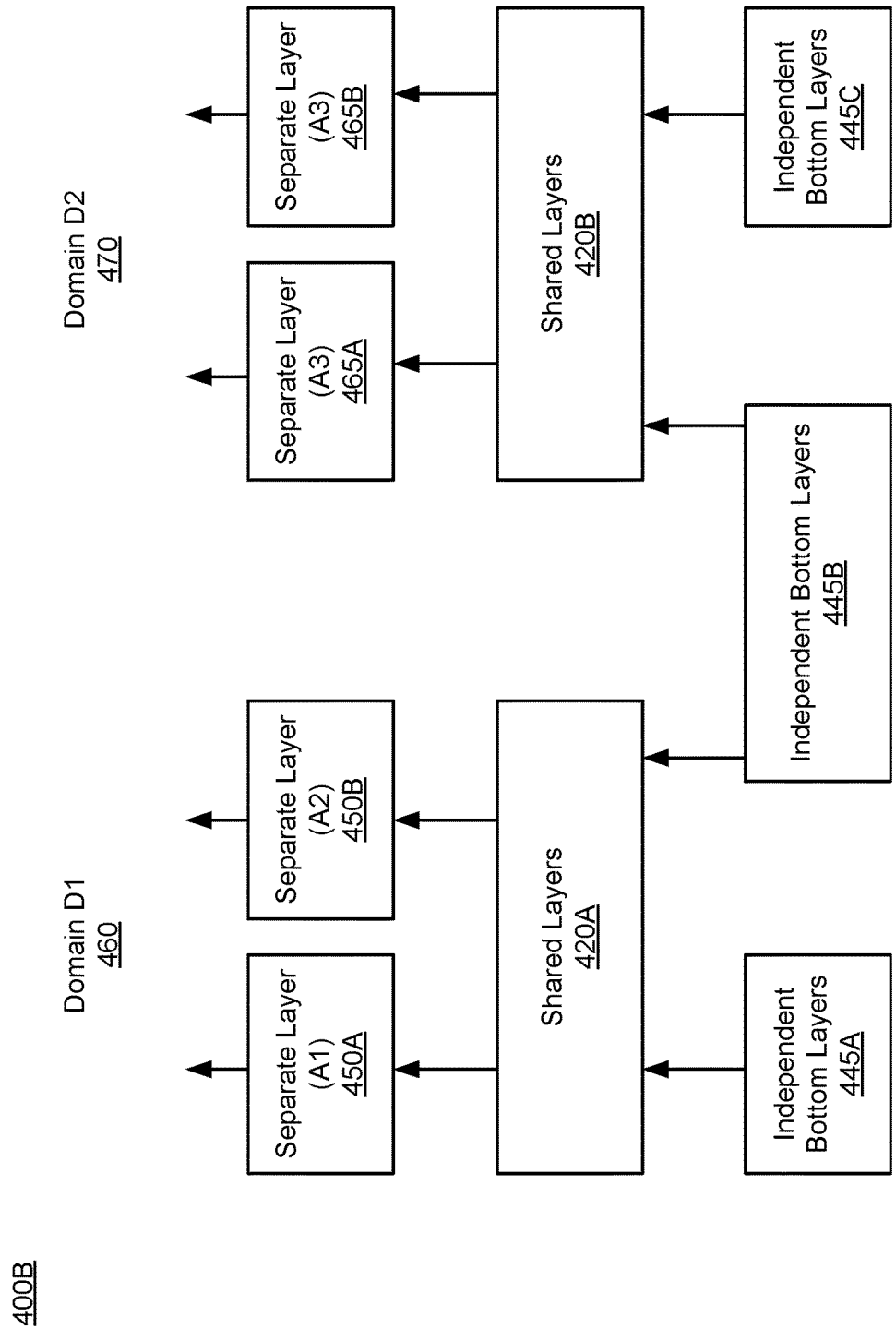
FIG. 4B is an example of a second flexible multi-task neural network prediction model applied to a content item for predicting interactions between a viewing user and the content item, in accordance with an embodiment.

FIG. 4B is an example of a second flexible multi-task neural network prediction model 400B applied to the content item 110 for predicting one or more specific tasks between the viewing user 105 and the content item 110, in accordance with an embodiment. The second multiple-task neutral network prediction model 400B has independent bottom layers (445A, 445B, and 445C), shared layers (420A and 420B), separate layers (450A and 450B) associated with the domain D1 460, and separate layers (465A and 465B) associated with the domain D2 470. The independent bottom layers 445A extracts features (e.g., features associated with characteristics of the poster) that are specific to the domain D1 460, and the extracted features are not shared by a task domain D2 470 (e.g., a task domain for advertisement ranking). The independent bottom layers 445B extracts common features (e.g., features associated with characteristics of the viewing user 105) that are shared across the domain D1 460 and the domain D2 470. The independent bottom layers 445C extracts features (e.g., features associated with previous interaction that the viewing user 105 clicked on one or more advertisements) that are specific to the domain D2 470, and the extracted features are not shared by the domain D1. Features outputted from the independent bottom layers 445A and 445B are inputs to the shared layers 420A to extract common features that are shared across the tasks A1 and A2 in the domain D1 460. Outputs from the shared layers 420A are inputs to the separate layers 450A and 450B for predicting how likely the viewing user 105 will perform the tasks A1 and A2.

Features outputted from the independent bottom layers 445C are inputs to the shared layers 420B to extract common features that are shared across tasks A3 and A4 in the domain D2 470. Examples of the tasks in the domain D2 470 include clicking on an advertisement inserted in the opportunity 150, or making a purchase on the advertisement inserted in the opportunity 150. Outputs from the shared layers 420B are inputs to the separate layers 465A and 465B for predicting how likely the viewing user 105 will perform the tasks A3 and A4. As such, what the multi-task neural network model 400B learned in the domain D1 460 (e.g., feed ranking) can be used to further train the multi-task neural network model 400B in the domain D2 470 (e.g., advertisement ranking), or vice versa, thereby resulting in predicting various tasks in different task domains with better prediction results, compared with predicting tasks in only one task domain.

Figure 4C:
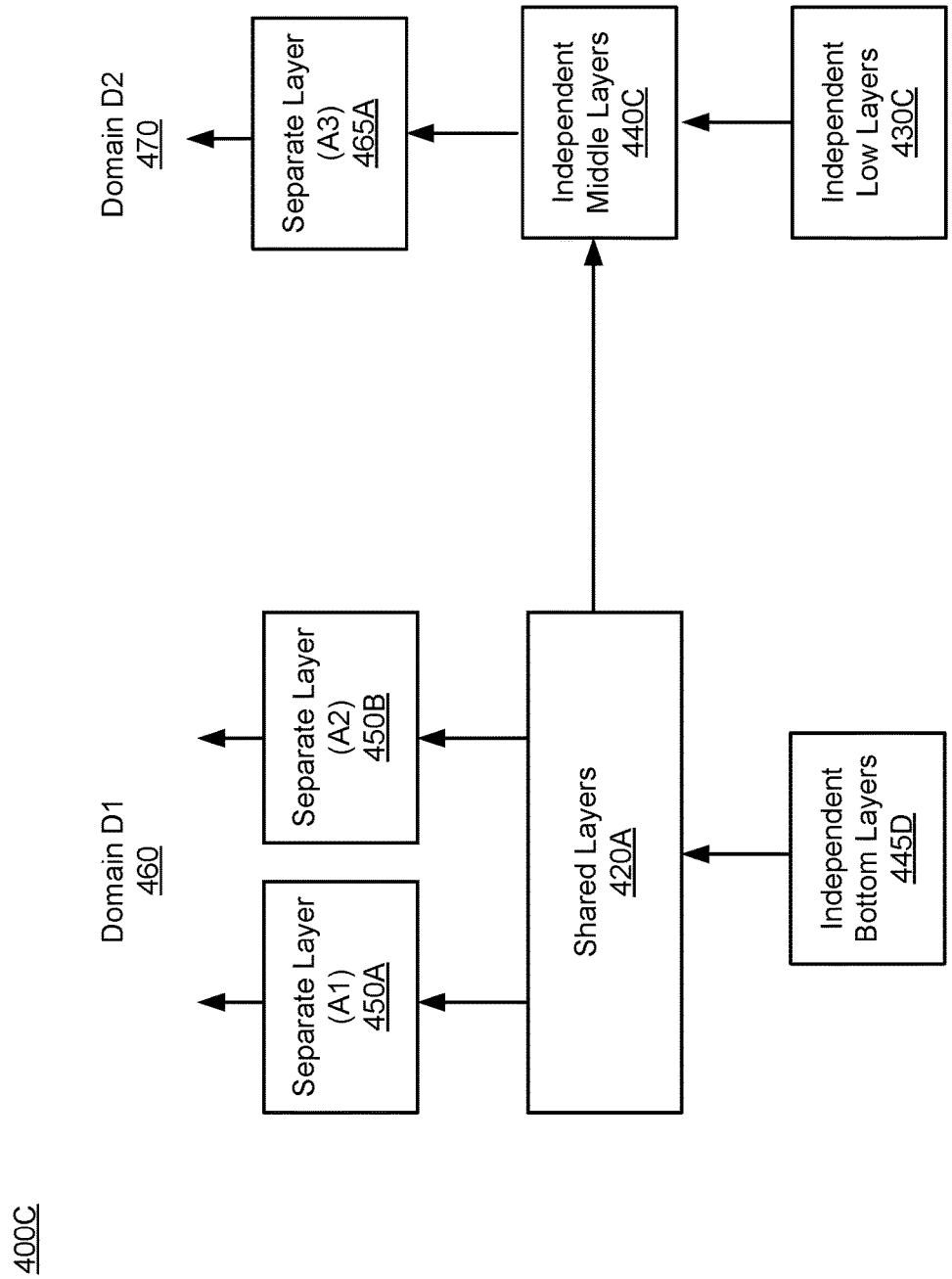
FIG. 4C is an example of a third flexible multi-task neural network prediction model applied to a content item for predicting interactions between a viewing user and the content item, in accordance with an embodiment.

FIG. 4C is an example of a third multi-task neural network prediction model 400C applied to the content item 110 for predicting one or more specific tasks between the viewing user 105 and the content item 110, in accordance with an embodiment. The third multiple-task neutral network prediction model 400C has independent bottom layers 445D, the shared layers 420A, separate layers (450A and 450B), independent low layers 430C, independent middle layers 440C, and the separate layer 465A. The independent bottom layers 445D extracts features for the domain D1 460, and the extracted features may include common features that are shared by the domain D2 470. Outputs from the independent bottom layers 445D are inputs to the shared layers 420A to extract common features that are shared across the tasks A1, A2, and A3. The independent low layers 430C extracts features for the domain D2 470, and the extracted features are not shared by the domain D1 460. The independent middle layers 440C combine features outputted from the independent low layers 430C and features outputted from the shared layers 420A to generated combined features for the separate layer 465A. In various embodiments (not shown), the prediction model 400C includes more separate layers in the domain D1 460 and the domain D2 470.

Example of Training Multi-Task Neural Network Prediction Model

Figure 5:
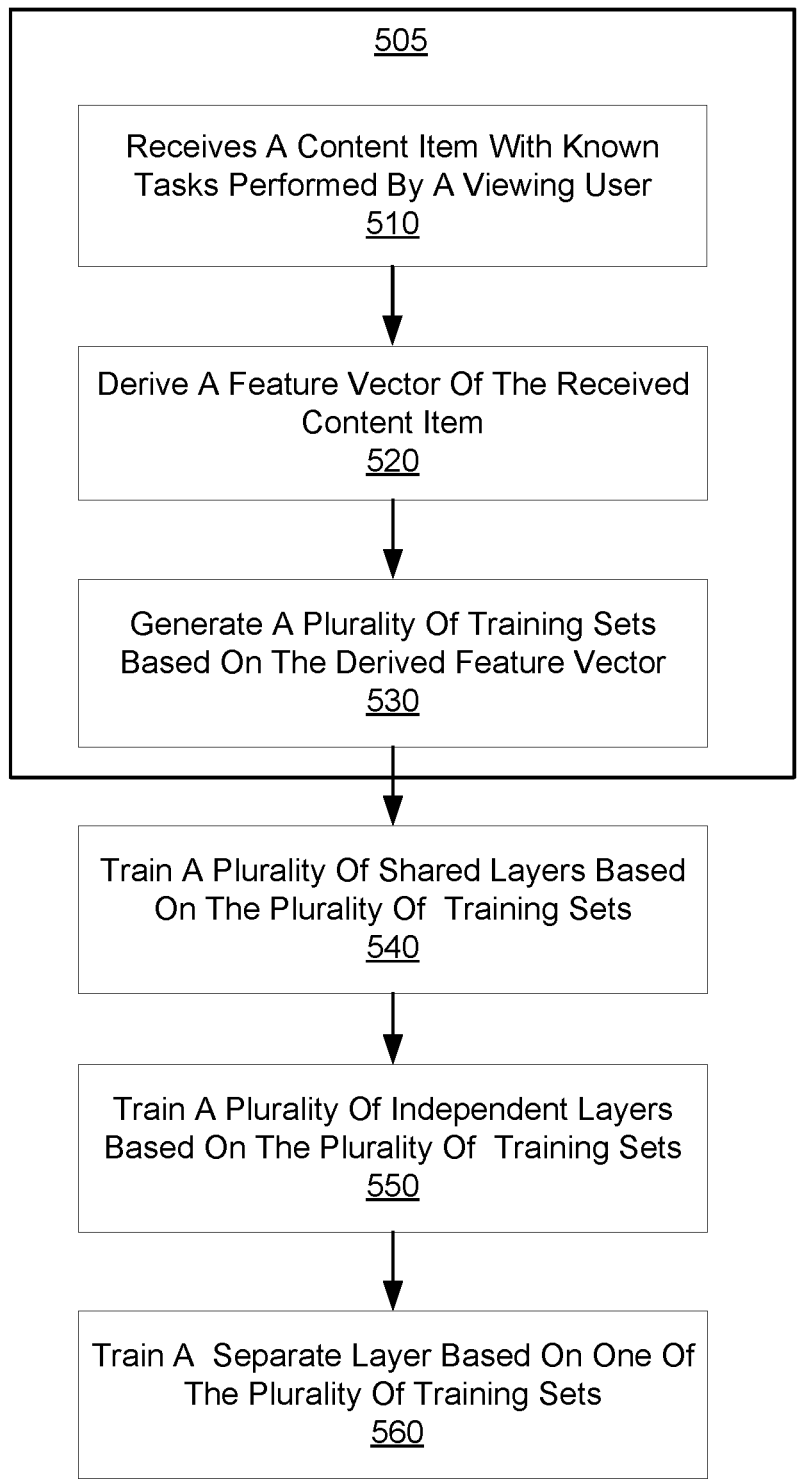
FIG. 5 is a flowchart illustrating a process for training a flexible multi-task neural network prediction model, in accordance with an embodiment.

FIG. 5 is a flowchart illustrating a process 500 for training a flexible multi-task neural network prediction model, in accordance with an embodiment. The process 500 may include different or additional steps than those described in conjunction with FIG. 5 in some embodiments or perform steps in different orders than the order described in conjunction with FIG. 5.

The online system 240 receives 510 a content item with known tasks performed by a viewing user. Examples of content items may include stories, photos, videos, invitations, and advertisements. Examples of tasks may include liking the content item, sharing the content item, commenting on the content item, sharing the content item with message, installing an application associated with the content item, following on the content item, clicking on the content item, visiting a website via clicking on the content item, placing the content item in a virtual shopping cart, or purchasing the content item.

The online system 240 derives 520 a feature vector corresponding to the content item. For example, the feature extractor 310 of the online system 240 derives a feature vector corresponding to the relationships between the content item and the viewing user, as described above with respect to the feature extractor 310 of FIG. 3.

The online system 240 generates 530 a plurality of training sets based on the derived feature vector. For example, the training set module 320 of the online system 240 generates a positive set and a negative set based on the derived feature vector. Steps 510 to 530 can be repeated 505 for different content items with known interactions performed by the same viewing user or different viewing users to obtain a sufficiently large training set.

The online system 240 trains 540 a plurality of shared layers based on the plurality of training sets. The online system 240 trains 550 a plurality of independent layers based on the plurality of training sets. The online system 240 trains 560 a separate layer based on one of the plurality of training sets. Examples are described above with respect to the model module 330 of FIG. 3.

In some embodiments, the online system 240 jointly trains the shared layers, the independent layers, and the separate layers. In various embodiments, the online system 240 trains the shared layers, the independent layers, and the separate layers, separately. For example, after the shared layers are trained jointly with at least some separate layers, if one or more additional non-trained separate layers are added to the current prediction model, the online system 240 trains the additional non-trained separate layers using associated training sets without training the shared layers. In another example, the online system 240 jointly trains the independent layers and separate layers, and/or jointly trains the shared layers and the separate layers.

Figure 6:
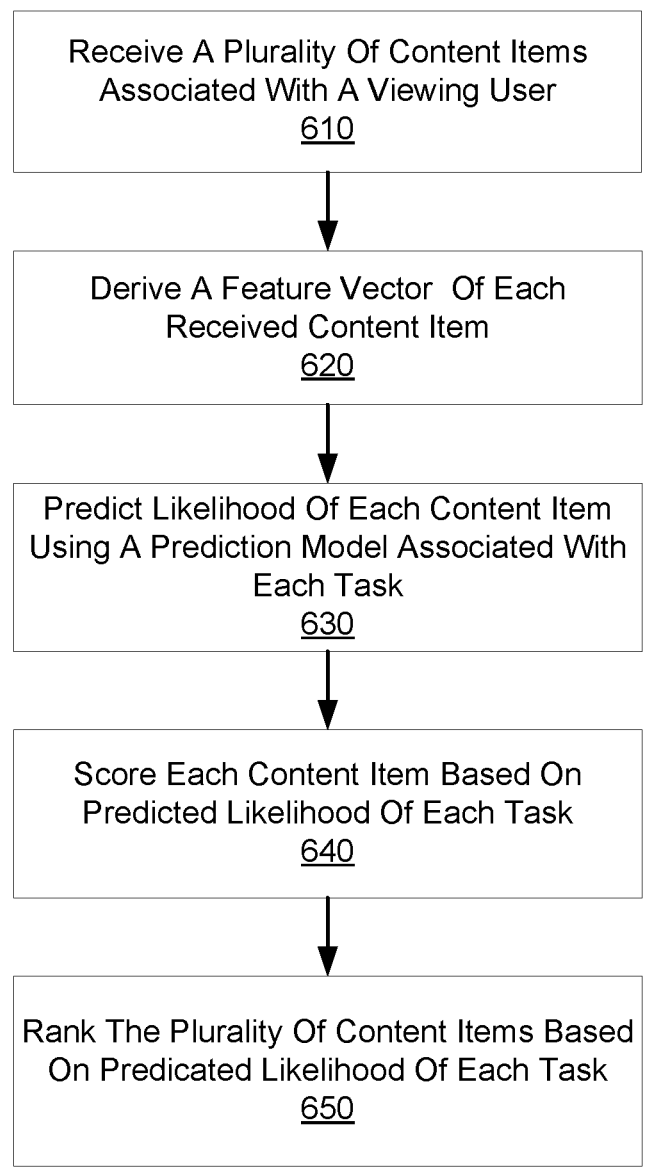
FIG. 6 is a flowchart illustrating a process for content ranking based on a flexible multi-task neural network prediction model, in accordance with an embodiment.

Example of Content Ranking Based on Flexible Multi-Task Neural Network Prediction Model FIG. 6 is a flowchart illustrating a process 600 for content ranking based on a flexible multi-task neural network prediction model, in accordance with an embodiment. The process 600 may include different or additional steps than those described in conjunction with FIG. 6 in some embodiments or perform steps in different orders than the order described in conjunction with FIG. 6.

The online system 240 receives 610 a plurality of content items associated with a viewing user. The online system 240 derives 620 a feature vector of each received content item. The online system 240 predicts 630 likelihood of each content item using a prediction model associated with a plurality of tasks. For example, the online system 240 retrieves the prediction model previously generated by the model module 330. The online system 240 applies each feature vector to the retrieved prediction model and predicts likelihood of each task. The online system 240 scores 640 each content item based on predicted likelihood of each task. The online system 240 ranks 650 the plurality of content items based on the scoring, as described above with respect to the content ranking module 340 of FIG. 3.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method performed by an online system, the method comprising:
receiving a plurality of content items associated with a viewing user;
deriving a feature vector for each content item;
predicting a likelihood of interacting with each content item using a prediction model associated with a plurality of tasks, wherein a first task of the plurality of tasks is associated with a first domain and a second task of the plurality of tasks is associated with a second domain, the prediction model comprising:
a first independent bottom layer associated with the first domain, the first independent bottom layer configured to extract features that are specific to the first domain and not shared with the second domain;
a second independent bottom layer configured to extract features that are shared across the first domain and the second domain;
a plurality of shared layers configured to extract common features that are shared across the plurality of tasks, the plurality of shared layers using the extracted features from the first independent bottom layer and the second independent bottom layer as input;
a plurality of separate layers, each separate layer configured to predict likelihood of the viewing user performing a task associated with the separate layer based on the features extracted from the first independent bottom layer, the second independent bottom layer, and the plurality of shared layers; and
ranking the plurality of content items based on the predicting.

2. The computer-implemented method of claim 1, wherein the feature vector comprises characteristics of a corresponding content item, characteristics of a poster who posted the corresponding content item, characteristics of the viewing user, and relationships among the corresponding content item, the poster and the viewing user.

3. The computer-implemented method of claim 2, wherein the relationships comprises: prior interactions between the corresponding content item and the viewing user, affinities between the poster and/or poster's friends and the viewing user, a time period when the corresponding content item is to be presented to the viewing user, and a recurring frequency of the corresponding content item that was presented to the viewing user.

4. The computer-implemented method of claim 1, wherein the content item comprises stories, photos, videos, invitations, and advertisements.

5. The computer-implemented method of claim 1, wherein the prediction model is not trained by training data for at least one of the plurality of tasks.

6. The computer-implemented method of claim 5, wherein the prediction model comprises the plurality of shared layers trained by a first group of the plurality of tasks and at least one of the plurality of separate layers not trained by the first group of the plurality of tasks.

7. The computer-implemented method of claim 1, wherein the plurality of independent layers comprises a plurality of independent bottom layers configured to extract features as inputs for the plurality of shared layers, and a plurality of independent low layers configured to extract features as inputs for the plurality of separate layers.

8. The computer-implemented method of claim 7, wherein the plurality of independent layers further comprises a plurality of independent middle layers configured to combine common features extracted from the plurality of shared layers and features extracted from the plurality of independent low layers to generate combined features as inputs for the plurality of separate layers.

9. The computer-implemented method of claim 1, wherein the plurality of independent layers and the plurality of separate layers are trained jointly.

10. The computer-implemented method of claim 1, wherein the plurality of shared layers and the plurality of independent layers are trained individually.

11. A non-transitory computer-readable medium comprising computer program instructions that when executed by a computer processor of an online system causes the processor to perform steps comprising:
receiving a plurality of content items associated with a viewing user;
deriving a feature vector for each content item;
predicting a likelihood of interacting with each content item using a prediction model associated with a plurality of tasks, wherein a first task of the plurality of tasks is associated with a first domain and a second task of the plurality of tasks is associated with a second domain, the prediction model comprising:
a first independent bottom layer associated with the first domain, the first independent bottom layer configured to extract features that are specific to the first domain and not shared with the second domain;
a second independent bottom layer configured to extract features that are shared across the first domain and the second domain;
a plurality of shared layers configured to extract common features that are shared across the plurality of tasks, the plurality of shared layers using the extracted features from the first independent bottom layer and the second independent bottom layer as input;
a plurality of separate layers, each separate layer configured to predict likelihood of the viewing user performing a task associated with the separate layer based on the features extracted from the first independent bottom layer, the second independent bottom layer, and the plurality of shared layers; and
ranking the plurality of content items based on the predicting.

12. The non-transitory computer-readable medium of claim 11, wherein the feature vector comprises characteristics of a corresponding content item, characteristics of a poster who posted the corresponding content item, characteristics of the viewing user, and relationships among the corresponding content item, the poster and the viewing user.

13. The non-transitory computer-readable medium of claim 12, wherein the relationships comprises: prior interactions between the corresponding content item and the viewing user, affinities between the poster and/or poster's friends and the viewing user, a time period when the corresponding content item is to be presented to the viewing user, and a recurring frequency of the corresponding content item that was presented to the viewing user.

14. The non-transitory computer-readable medium of claim 11, wherein the content item comprises stories, photos, videos, invitations, and advertisements.

15. The non-transitory computer-readable medium of claim 11, wherein the prediction model is not trained by training data for at least one of the plurality of tasks.

16. The non-transitory computer-readable medium of claim 15, wherein the prediction model comprises the plurality of shared layers trained by a first group of the plurality of tasks and at least one of the plurality of separate layers not trained by the first group of the plurality of tasks.

17. The non-transitory computer-readable medium of claim 11, wherein the plurality of independent layers comprises a plurality of independent bottom layers configured to extract features as inputs for the plurality of shared layers, and a plurality of independent low layers configured to extract features as inputs for the plurality of separate layers.

18. The non-transitory computer-readable medium of claim 17, wherein the plurality of independent layers further comprises a plurality of independent middle layers configured to combine common features extracted from the plurality of shared layers and features extracted from the plurality of independent low layers to generate combined features as inputs for the plurality of separate layers.

19. The non-transitory computer-readable medium of claim 11, wherein the plurality of independent layers and the plurality of separate layers are trained jointly.

20. The non-transitory computer-readable medium of claim 11, wherein the plurality of shared layers and the plurality of independent layers are trained individually.

* * * * *